United States Patent [19]
Thompson et al.

[11] Patent Number: 6,160,083
[45] Date of Patent: Dec. 12, 2000

[54] METHOD FOR MAKING MODIFIED TERPENE-PHENOL RESINS

[75] Inventors: Kerry L. Thompson; Abhay K. Deshpande, both of Panama City, Fla.

[73] Assignee: Arizona Chemical Company, Panama City, Fla.

[21] Appl. No.: 09/081,496

[22] Filed: May 19, 1998

[51] Int. Cl.[7] .................................................. C08G 63/78
[52] U.S. Cl. ........................ 528/205; 528/86; 528/491; 528/497; 528/503
[58] Field of Search ............................ 528/205, 86, 491, 528/497, 503

[56] References Cited

U.S. PATENT DOCUMENTS

| | | | |
|---|---|---|---|
| 2,343,845 | 3/1944 | Powers | 260/62 |
| 2,471,455 | 5/1949 | Rummelsburg | 260/62 |
| 2,596,235 | 5/1952 | Geiger | 260/619 |
| 3,297,673 | 1/1967 | Sellers, Jr. et al. | 260/93.3 |
| 3,383,362 | 5/1968 | Gonzenbach | 260/62 |
| 3,692,844 | 9/1972 | Hollis et al. | 260/619 D |
| 3,929,938 | 12/1975 | White et al. | 260/897 B |
| 3,976,606 | 8/1976 | Gobran | 260/4 AR |
| 3,993,626 | 11/1976 | Laurito | 260/47 UA |
| 4,056,513 | 11/1977 | Lahourcade et al. | 260/62 |
| 4,081,425 | 3/1978 | Gscheidmeier et al. | 260/62 |
| 4,279,659 | 7/1981 | Unmuth | 106/230 |
| 5,457,175 | 10/1995 | Scharrer et al. | 528/205 |

FOREIGN PATENT DOCUMENTS

| | | |
|---|---|---|
| 1043159 | 9/1966 | United Kingdom . |
| WO 94/18257 | 8/1994 | WIPO . |

*Primary Examiner*—Duc Truong
*Attorney, Agent, or Firm*—Luedeka, Neely & Graham, P.C.

[57] ABSTRACT

The specification discloses a method for making low softening point modified terpene-phenol resins having improved properties. In the process, phenol is reacted in an organic solvent containing a Lewis acid catalyst with an acyclic mono-unsaturated olefin and terpene under reaction conditions sufficient to produce an alkyl-modified terpene-phenol resin at a relatively high yield having a softening point in the range of from about 70° to about 110° C., a Gardner color below about 6 and a polydispersity index below about 1.5. Due to its relatively low Gardner color number, the resin may be used substantially as produced avoiding additional decoloration steps which result in reduced product yield and increased cost. The product contains less volatile components and has improved compatibility with A-B and A-B-A copolymers as compared with many conventional modified terpene-phenol resins.

39 Claims, 2 Drawing Sheets

METHOD FOR MAKING MODIFIED TERPENE-PHENOL RESINS

FIELD OF THE INVENTION

The present invention relates to an improved method for making modified terpene-phenol resins which exhibit relatively low softening points and have relatively light colors.

BACKGROUND

Terpene-phenol resins are used in a variety of applications including adhesive and ink formulations and in the manufacture of engineering thermoplastics. Commercial terpene-phenol resins are typically produced by reacting a terpene with a phenol in a suitable solvent in the presence of a catalyst. After the reaction is substantially complete, the catalyst is deactivated with water or clay, and the resin is isolated from the reaction mass product by distillation to remove the solvent and by-products.

Terpene-phenol resins produced by currently available processes often have softening points above about 110° C. and/or dark colors which reduce the usefulness of the product in certain adhesive and ink formulations.

Attempts to improve the color properties of such terpene-phenol resins have been largely unsuccessful in that they increase the production costs of these resins and/or reduce the product yield. For example, U.S. Pat. No. 3,383,362 to Gonzenbach describes a conventional method for making a phenol-terpene-cyclic polyolefin resin by reacting phenol or alkyl phenol, terpene or a low molecular weight propylene polymer and a cyclic polyolefin in the presence of a Friedel-Crafts catalyst and an aromatic, naphthenic or parraffinic hydrocarbon solvent. Products made by the process are said to have softening points ranging from 54° to 123° C.; however, the products exhibit an undesirable reddish brown color. Accordingly, for adhesive applications a color removal or color improvement step is often required. Furthermore, the cyclic polyolefins used to make the phenol-terpene-cyclic polyolefin compounds produce products having unacceptable amounts of low molecular weight fractions. The low molecular weight fractions tend to volatilize or cause "smoking" during preparation and use of hot melt adhesives containing the compounds.

It is therefore an object of the invention to provide a method for making relatively low softening point terpene-phenol-based resins having a relatively light color.

Another object of the invention is to provide a method for making terpene-phenol resins at a relatively low reaction temperature and in relatively high yield.

Still another object of the invention is to provide an improved method for making terpene-phenol resins having softening points in the range of from about 70° to about 110° C. without the need for a separate decoloration step.

A further object of the invention is to provide a method for making terpene-phenol compounds which exhibit improved thermal stability and therefore do not exhibit significant volatilization of low molecular weight fractions during production and/or use.

SUMMARY OF THE INVENTION

With regard to the above and other objects, the invention provides a method for making a low softening point terpene-phenol-based resin which comprises reacting a phenol dissolved in an organic solvent with terpene and an acyclic mono-unsaturated olefin in the presence of a Lewis acid catalyst at a temperature and for a time sufficient to produce an alkyl-modified terpene-phenol resin having a softening point in the range of from about 70° to about 110° C. and a Gardner color below about 6, preferably below about 4.

In another aspect, the invention provides a method for making an alkyl-modified terpene-phenol resin comprising reacting phenol dissolved in an organic solvent with a mixture containing from about 0.05 to about 4.0 moles of terpene per mole of phenol and from about 0.005 to about 3.6 moles of an acyclic mono-unsaturated olefin per mole of phenol in the presence of a Lewis acid catalyst at a temperature ranging from about 5° to about 75° C. for a time sufficient to produce an alkyl-modified terpene-phenol resin having a softening point in the range of from about 70° to about 110° C. and a Gardner color below about 6, preferably below about 4.

In accordance with a further aspect of the invention, a method is provided for making an aliphatic-modified terpene-phenol resin which comprises reacting phenol dissolved in an organic solvent in the presence of a Lewis acid catalyst with a mixture containing terpene and an acyclic mono-unsaturated olefin at a mole ratio of the total amount of terpene and olefin in the mixture to the amount of phenol of from about 0.05 to about 4.0 total moles to moles of phenol at a temperature and for a time sufficient to produce an aliphatic-modified terpene-phenol resin having a softening point in the range of from about 70° to about 110° C. and a Gardner color below about 6, preferably below about 4.

According to another aspect of the invention, a modified terpene-phenol resin is provided as the reaction product of a terpene, an acyclic mono-unsaturated olefin and phenol wherein the reaction product has a number average molecular weight in the range of from about 550 to about 680 daltons, a polydispersity index below about 1.5 and a Gardner color below about 4 prior to any subsequent color improving treatment.

Terpene-phenol resins according to the invention exhibit improved compatibility with A-B and A-B-A block copolymers having styrene end-blocks and conjugated diene mid-blocks as compared with terpene-phenol resins made using prior methods. The improved compatibility is believed to be due, at least in part, to the relatively decreased proportion of low molecular weight fractions in the reaction product. Resins made according to the invention also exhibit a lighter color; hence, the burden of finishing decolorization steps is significantly eased with attendant cost savings.

BRIEF DESCRIPTION OF THE DRAWINGS

The above and other features and advantages of the invention will now be further described in the following detailed description of preferred embodiments of the invention considered in conjunction with the drawings in which.

DETAILED DESCRIPTION OF THE INVENTION

Figure 1:
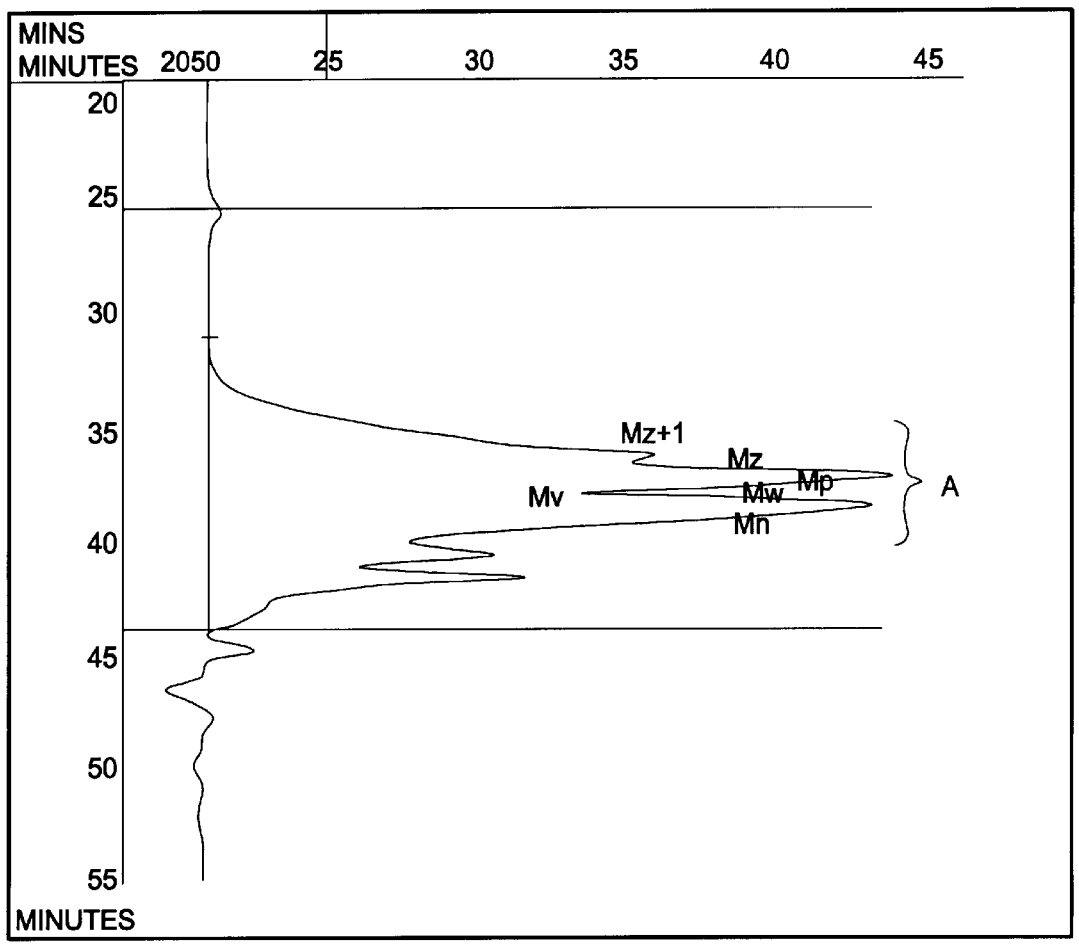
FIG. 1 is a graphical representation of the molecular weight distribution of a terpene-phenol resin made according to the invention.

In the production of terpene-phenol resins according to a preferred embodiment of the invention, a phenol is first dissolved in an organic solvent. Unless otherwise indicated, as used herein the term "phenol" includes substituted and unsubstituted phenols and derivatives thereof. Accordingly, phenols suitable for use in the process according to the invention include unsubstituted phenol, mono-alkyl substituted phenols and dialkyl substituted phenols such as o-, m- and p-cresol, xylenols, octyl phenol, dioctylphenol, nonylphenol and dinonylphenol. Of the foregoing, the unsubstituted phenols are preferred.

Particularly preferred solvents are polar or aromatic solvents that are inert with respect to the reaction of the invention which may be aromatic, haloaromatic or haloalkanes. Especially preferred polar or aromatic are selected from the group consisting of benzene, toluene, xylene, chlorobenzene and methylene chloride.

Non-polar organic solvents, while not preferred, may also be used in conjunction with a polar solvent provided the non-polar solvents are inert with respect to the reaction. Exemplary non-polar solvents which may be used are selected from the group consisting of hexane, pentane, cyclohexane, naphthas and other inert olefins.

The amount of solvent in the reaction mixture may range from about 0.5 to about 20 parts by weight per part phenol, and is preferably from about 1.7 to about 6 parts by weight per part phenol. The solvent may be 100 wt. % aromatic, 100 wt. % aliphatic or any mixture of aromatic and aliphatic solvents. A particularly preferred solvent for use in the invention is a mixture of about 55 wt. % VM&P Naphtha and about 45 wt. % xylene.

The phenol and solvent may be charged to a reaction vessel in any order or substantially simultaneously with stirring. Once the phenol and solvent are charged and the phenol is dissolved in the solvent, the solution is preferably distilled azeotropically to remove any water from the solution. The step of distilling the phenol solution is not required if the phenol and solvent are previously dried and maintained in a dry atmosphere so that the water content of the phenol and solvent is below about 200 ppm. Excess water in the solution is undesirable since it may adversely affect the catalyst performance.

After distillation, the solution is cooled to room temperature under an inert gas atmosphere, such as nitrogen or argon, and a catalyst is charged to the reaction vessel. The catalyst may be selected from a wide variety of Lewis acid catalysts such as aluminum halides, titanium halides, boron halides, protic acids, clays and modified clays, and alkyl and phenyl derivaties of boron, aluminum, and titanium halides. Of these, the preferred catalysts are the boron halide catalysts, with boron trifluoride being particularly preferred.

The amount of catalyst relative to phenol in the reaction mixture may range from about 0.4 to about 5.0 wt. % based on the weight of the phenol, with from about 1.0 to about 2.0 wt. % catalyst being particularly preferred.

In a preferred embodiment, the terpene and olefin are added to the phenol/solvent mixture following the catalyst. The terpene reactant may be selected from the group consisting of relatively pure α-pinene, β-pinene, d-limonene, dipentene (racemic limonene), δ-3 carene, β-phellandrene and pyrolysates of α-pinene, β-pinene, δ-3 carene and turpentine. Of the foregoing, the preferred terpenes are α-pinene, β-pinene, d-limonene, and dipentene. A particularly preferred terpene is α-pinene since it is relatively inexpensive and is readily available for use by the adhesive and ink formulation industry. However, a mixture of any or all of the foregoing terpenes may be used including turpentine which is an essential oil whose chief constituents may include α-pinene, β-pinene, dipentene and δ-3 carene.

An important feature of the invention is use of an acyclic mono-unsaturated olefin, which is preferably a mono-, di- or tri-alkyl-substituted mono-unsaturated olefin having alkyl substituents containing from about 3 to about 30 carbon atoms. Of the acyclic mono-unsaturated olefins, diisobutylene, which is a mixture of 1-diisobutylene and 2-diisobutylene, is particularly preferred. Other acyclic mono-unsaturated olefins which may be used include isobutylene, 2-methyl-2-butene, 2-methyl-2-pentene and 2-methyl-1-pentene, 1-octene, 1-decene, and 1-dodecene having the formula $CH_2=CHR$ wherein R is a $C_1$ to $C_{28}$ alkyl group.

In relation to the phenol in the mixture, it is preferred to use from about 0.05 to about 4.0 moles of terpene per mole of phenol, most preferably from about 0.5 to about 1.5 moles of terpene per mole of phenol, and to use from about 0.005 to about 3.6 moles of olefin per mole of phenol, most preferably from about 0.1 to about 0.5 moles of olefin per mole of phenol.

The terpene is preferably charged to the phenol/solvent mixture containing the catalyst with stirring after heating the phenol/solvent mixture to above room temperature, preferably in the range of from about 25° to about 50° C. It is particularly preferred to charge the terpene and olefin together as a blend. Preferably, the mole ratio of total moles of terpene and olefin in the blend to phenol in the mixture ranges from about 0.2 total moles of terpene and olefin per mole of phenol to about 5 total moles of terpene and olefin per mole of phenol, more preferably from about 0.5 to about 3.0 total moles of terpene and olefin per mole of phenol, and most preferably from about 0.9 to about 1.5 total moles of terpene and olefin per mole of phenol.

While charging the blend of terpene and olefin to the reaction vessel either separately or as a blend, the reaction mass is maintained at temperature below about 75° C., preferably in the range of from about 25 to about 50° C., with auxiliary cooling of the mass applied if necessary to maintain the temperature in the desired range. Because the reaction between the phenol, terpene and olefin is exothermic, the rate of addition of the terpene and/or olefin to the reaction mass should typically be limited such that the reaction mass is capable of being cooled at a rate sufficient to maintain the desired reaction temperature using conventional temperature control techniques. Auxiliary cooling techniques may include subcooling the reactants, circulating a portion of the reaction mass through an external heat exchanger, using internal cooling coils and/or cooling the reactor vessel using a cooling jacket.

Depending on the method used to maintain the reaction mass temperature within the desired range, addition of the terpene and olefin reactants to the reaction vessel may require from about 2 to about 4 hours. Longer or shorter times may be required depending on the scale and type of equipment used, the size of reaction mass, and the capability of cooling the contents. During and after charging the reactants and catalyst to the reaction vessel, it is also preferred to stir the reaction mass to encourage good contact between the reactants and complete and uniform reaction.

The order of addition of the reactants to a reaction vessel is not particularly critical to the invention provided the reactants are charged in a manner which facilitates control of the reaction temperature. Accordingly, a blend of terpene and olefin may be added to a mixture of solvent, phenol and catalyst or the terpene may be charged to the reaction vessel containing solvent, phenol and catalyst followed by charging the olefin. In an alternative process, the catalyst may be charged to a mixture of solvent, phenol, terpene and olefin in a reaction vessel. However, when the catalyst is charged to the other reactants smaller batches may be required to facilitate control of the temperature of the reactants.

Although the reaction is preferably carried out on a batch basis, the reaction may also be conducted continuously whereby the catalyst, phenol, terpene, olefin and solvent are charged essentially simultaneously to a reaction vessel while maintaining the desired ratios of reactants, catalyst and solvent to provide the modified terpene-phenol resin product.

The reactants are preferably maintained under an inert gas atmosphere during the reaction. Suitable inert gases include nitrogen and argon. The pressure of the reaction mass is not believed to be critical. Accordingly, the reaction may be conducted under superatmospheric, atmospheric or subatmospheric pressures with atmospheric pressure being particularly preferred.

When the reaction is substantially complete, as indicated by the absence of an exotherm or temperature rise in the reaction mass, the reaction product mixture is preferably quenched by stirring in a basic solution, preferably sodium carbonate solution, to deactivate the catalyst. The basic solution preferably contains at least about 0.5 wt. % base or an amount sufficient to neutralize and deactivate the catalyst. Accordingly, the amount of basic solution added to the reaction mass product may range from about 15 to about 200 grams per gram of catalyst depending on the solution concentration and the type of base used.

After quenching the catalyst, stirring is discontinued and the reaction product is heated, preferably to a temperature above about 75° C., most preferably from about 80° to about 95° C., to promote separation of the product into an aqueous phase and an organic phase. The aqueous phase and organic phase may be separated from each other by well known phase separation techniques such as decantation, centrifugation and the like or the organic phase may be recovered from the reaction product by extraction or drying techniques.

The separated organic phase containing the reaction product is then preferably washed with distilled water at an elevated temperature of from about 80° to about 95° C. to remove traces of catalyst and other impurities. Typically the wash water will readily separate as a distinct phase and can be separated by decantation or the like.

The washed reaction product is then preferably distilled at a temperature in the range of from about 120° to about 210° C. to remove the solvent and any unreacted phenol. Distillation to remove the solvent and unreacted phenol is preferably conducted at atmospheric pressure and under inert gas atmosphere.

After distilling the product, the product may be sparged with an inert gas such as nitrogen at a temperature ranging from about 210° to about 260° C. to remove any low molecular weight terpene-phenol alkylates and terpene-terpene dimers and to produce a high yield of relatively low softening point terpene-phenol resin having a softening point in the range of from about 70° to about 110° C. The yield of resin is determined by the weight of final resin product divided by the total weight of terpene, olefin and phenol charged to the reaction vessel. Resins produced according to the invention also have a Gardner color less than about 6, typically below about 4, a polydispersity below about 1.5 and molecular weights in the range of from about 550 to about 680 daltons.

In order to facilitate a further understanding of the invention, the following non-limiting examples illustrate one or more aspects thereof.

EXAMPLE 1

A one liter, three neck round bottom flask equipped with overhead stirring was charged with 94 grams (1.0 moles) of phenol and 196.4 grams of solvent mixture containing 55 wt. % VM&P naphtha and 45 wt. % xylene. The phenol was dissolved in the solvent and the solution was refluxed azeotropically to remove any water. The solution was cooled to room temperature and placed under a nitrogen atmosphere. A boron trifluoride catalyst (1.0 gram, 0.014 moles) was then charged to the solution with stirring and the mixture was heated to 40° C.

A blend of 140.1 grams (1.03 moles) of alpha-pinene available from Arizona Chemical Company of Panama City, Fla. under the tradename of ACINTENE A and 13.4 grams (0.12 moles) of commercial grade diisobutylene was added to the solution with sufficient cooling to maintain a reaction temperature of 40–42° C. The blend of alpha-pinene and diisobutylene was added dropwise over a period of 3 hours while stirring the reaction mass, and the reaction mass was then stirred for an additional 30 minutes.

The reaction mass was then quenched by adding 100 grams of 1 wt. % sodium carbonate solution to the flask. The resulting mass was heated to 80° C., and the stirring was discontinued in order to promote separation of the aqueous phase from an organic phase. The aqueous phase was removed from the reaction flask by decanting, and the organic phase was washed with 100 grams of distilled water.

After again separating the organic phase from the wash water by decantation, the organic phase was distilled to a temperature of 240° C. to remove the solvent and any unreacted phenol. The resulting resin was sparged with nitrogen at 240° C. to remove any low molecular weight terpene-phenol alkylates and terpene-terpene dimers. The final product weighed 237.6 grams and had a ring and ball softening point of 109° C., a neat Gardner color of 3 and a hydroxyl number (acetic anhydride reaction) of 162. The resin yield was 96%. Additional runs were conducted under the same conditions with different amounts of same reactants and solvents. The reaction conditions and product characteristics are provided in the table shown below as Runs 1–7.

EXAMPLE 2

The procedures of Example 1 were followed using 1-octene, 1-decene and 1-dodecene instead of diisobutylene. The amount of reactants, yield and properties of the products for these runs are given in the table as Runs 8–10.

EXAMPLE 3

For comparison purposes, a terpene-phenol resin was made using dicyclopentadiene instead of an acyclic mono-unsaturated olefin. In this reaction, 146 grams of xylene (1.38 moles) and 20.2 grams (0.215 moles) of phenol were charged to a 1 liter, three neck flask fitted with an overhead stirrer. To this mixture was added 5.9 grams (0.086 moles) of boron trifluoride gas by subsurface sparging into the mixture. The mixture was heated to 40–45° C.

Next, 70.3 grams (0.52 moles) of alpha-pinene were added to the flask dropwise while stirring the reaction mixture and maintaining the reaction temperature at 40–45° C. by means of a water cooled bath. The alpha-pinene was added to the flask over a period of 1 hour.

After addition of the alpha-pinene, 159.3 grams (1.21 moles) of dicyclopentadiene were added to the flask over a period of 2 hours while stirring the reaction mass and maintaining the reaction temperature at 40–45° C. The reaction was stopped after 30 minutes by adding 100 grams of water to the reaction mixture. The contents of the flask were then heated to 80–85° C. and then the stirring was stopped. An aqueous phase formed and was separated from the organic phase by decantation. The product was washed with 100 grams of distilled water followed by distillation to remove solvent and then nitrogen sparged at 240° C. to produce a resin having a 100° C. softening point in 99% yield. The resin had a reddish-brown color with a Gardner color of 15 (neat). The reaction conditions and product properties are shown in the table as Run 11.

EXAMPLE 4

The procedure of Example 3 was followed using 148 grams of xylene (1.39 moles), 20.2 grams (0.215 moles) of phenol, 5.9 grams (0.086 moles) of boron trifluoride, 102.9 grams (0.76 moles) of alpha pinene and 124.9 grams (0.95 moles) of dicyclopentadiene. The product yield was 71%, and the softening point of the resin was 104° C. The resin product had a reddish brown color with a Gardner color of 11–12 (neat). The reaction conditions and product properties are shown in the table as Run 12.

EXAMPLE 5

The procedure of Example 3 was followed using 191 grams of xylene (1.79 moles), 94 grams (1.0 mole) of phenol, 1.0 gram (0.014 moles) of boron trifluoride, 122.4 grams (0.90 moles) of alpha pinene and 33.0 grams (0.25 moles) of dicyclopentadiene and at a reaction temperature of 50° C. The product yield was 99%, and the softening point of the resin was 120° C. The resin product had a reddish brown color with a Gardner color of 9.8 (neat). The reaction conditions and product properties are shown in the table as Run 13.

A second run was conducted using the same amount of reactants but at a reaction temperature of 40° C. The product yield was 98%, and the softening point of the resin was 117° C. The resin product had a reddish brown color with a Gardner color of 7.9 (neat). The reaction conditions and product properties are shown in the table as Run 14.

EXAMPLE 6

The procedure of Example 3 was followed using 178.6 grams of xylene (1.68 moles), 94 grams (1.0 mole) of phenol, 1.0 gram (0.014 moles) of boron trifluoride, 122.4 grams (0.90 moles) of alpha pinene and 17.0 grams (0.25 moles) of piperylene at a reaction temperature of 40° C. The product yield was 96%, and the softening point of the resin was 92° C. The resin product had a reddish brown color with a Gardner color of 7.4 (neat). The reaction conditions and product properties are shown in the table as Run 15.

TABLE

| Run # | Terpene (grams) | olefin (grams) | phenol (grams) | solvent (grams) | Temp. (°C.) | Terpene Addition (hrs) | Yield (%) | Soft. Pt. (°C.) | Neat Color | Hydroxyl No. | $M_w$ | $M_n$ | Polydispersity ($M_w/M_n$) |
|---|---|---|---|---|---|---|---|---|---|---|---|---|---|
| 1 | 140.1 | DIB[1] (13.4) | 94.0 | 196.4 | 40 | 3 | 96 | 109 | 3.0 | 162 | 741 | 593 | 1.25 |
| 2 | 133.0 | DIB (19.0) | 94.0 | 196.4 | 40 | 3 | 95 | 106 | 3.2 | 160 | 736 | 579 | 1.27 |
| 3 | 125.1 | DIB (25.8) | 94.0 | 196.4 | 40 | 3 | 96 | 94 | 2.8 | 170 | — | — | — |
| 4 | 152.3 | DIB (31.4) | 60.2 | 250.0 | 40 | 3 | 99 | 107 | 2.9 | 39 | 894 | 667 | 1.34 |
| 5 | 142.2 | DIB (39.2) | 60.2 | 250.0 | 40 | 3 | 97 | 102 | 2.3 | 43 | 846 | 642 | 1.32 |
| 6 | 152.3 | DIB (31.4) | 60.2 | 250.0 | 50 | 3 | 91 | 102 | 3.1 | 71 | 777 | 608 | 1.28 |
| 7 | 142.2 | DIB (39.2) | 60.2 | 250.0 | 50 | 3 | 94 | 92 | 1.9 | 53 | 764 | 596 | 1.28 |
| 8 | 122.4 | 1-O[2] (28.0) | 94.0 | 163.2 | 50 | 2 | 92 | 76 | 2.1 | 137 | 679 | 554 | 1.22 |
| 9 | 122.4 | 1-D[3] (35.0) | 94.0 | 167.8 | 50 | 2 | 90 | 76 | 2.3 | 134 | 636 | 530 | 1.20 |
| 10 | 122.4 | 1-DD[4] (42.0) | 94.0 | 172.6 | 50 | 2 | 87 | 77 | 1.9 | 142 | 774 | 669 | 1.16 |
| 11 | 70.3 | DCD[5] (159.3) | 20.2 | 146.0 | 40 | 3 | 99 | 100 | 15.1 | — | 1263 | 419 | 3.01 |
| 12 | 102.9 | DCD (124.9) | 20.2 | 146.0 | 40 | 3 | 71 | 104 | 11.5 | — | 791 | 476 | 1.74 |
| 13 | 122.4 | DCD (33.0) | 94.0 | 191.0 | 50 | 3 | 99 | 120 | 9.8 | 144 | 1247 | 739 | 1.68 |
| 14 | 122.4 | DCD (33.0) | 94.0 | 191.0 | 40 | 3 | 98 | 117 | 7.9 | 140 | 1100 | 669 | 1.64 |
| 15 | 122.4 | PIP[6] (17.0) | 94.0 | 178.6 | 40 | 3 | 96 | 92 | 7.4 | 146 | 747 | 556 | 1.34 |

[1]DIB id diisobutylene;
[2]1-O is 1-octene;
[3]1-D is 1-decene;
[4]1-DD is 1-dodecene;
[5]DCD is dicyclopentadiene;
[6]PIP is piperylene.

As illustrated by the data in the table, terpene-phenol resin products made according to the invention exhibit softening points in the range of 76° to 109° C., and light colored product, i.e., products having Gardner colors (neat) of 1.9 to 3.2 and polydispersity indices of less than 1.5. In contrast, terpene-phenol resin made with cyclic olefins such as dicyclopentadiene exhibit significantly darker colors (Gardner colors of 7.9–15.1) and generally higher polydispersity indices (1.74–3.01) for products having similar softening points and polydispersity indices of 1.64 to 1.68 with softening points above 110° C. as shown by Runs 11–14.

Run 15 in particular shows the advantage of using acyclic mono-unsaturated olefins as compared to an acyclic poly-unsaturated olefin in the production of low softening point terpene-phenol-based resins. The product made using piperylene exhibited a substantially darker color, too dark for most commercial applications, as compared to products made using mono-unsaturated olefins, despite the similarity in softening point and polydispersity index of the product as compared with products made according to the invention.

Figure 2:
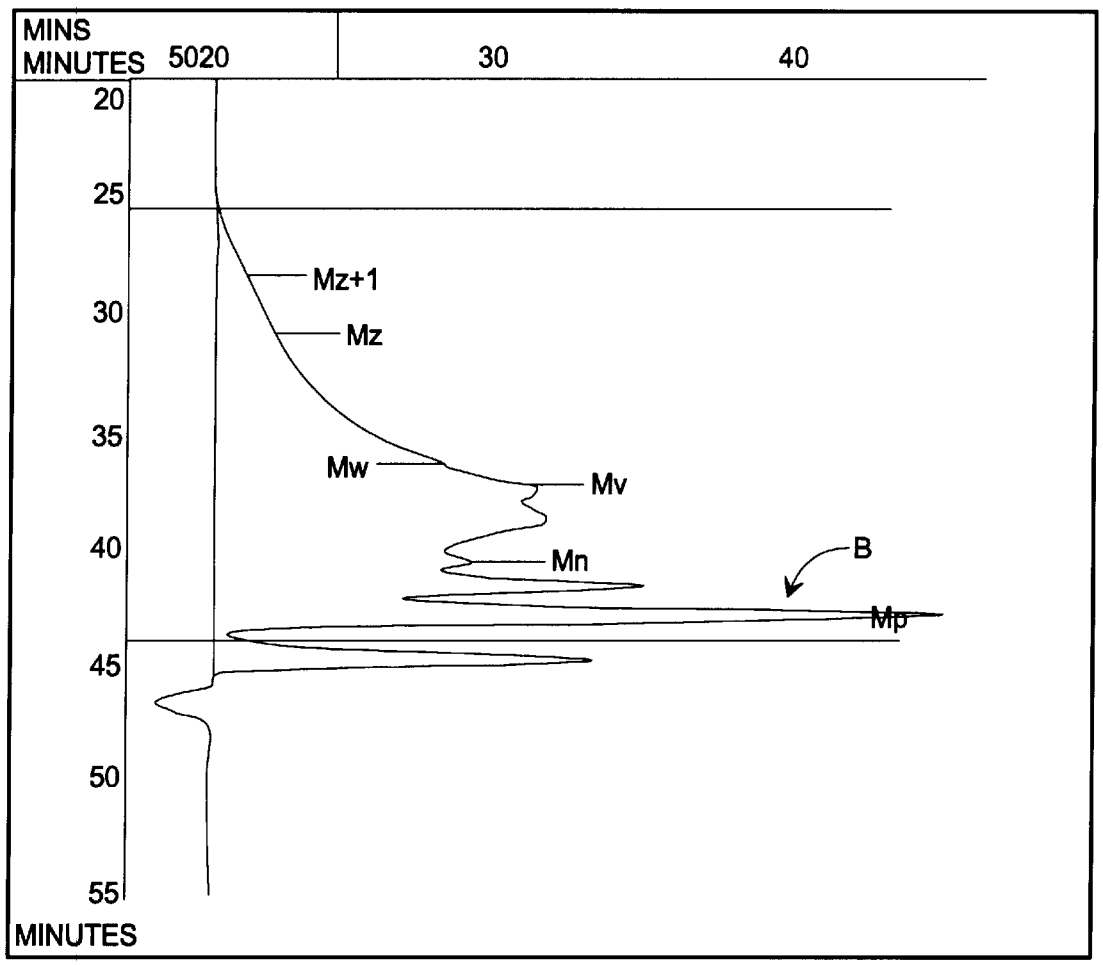
FIG. 2 is a graphical representation of the molecular weight distribution of a terpene-phenol resin made using a cyclic olefin.

The molecular weight distribution by GPC analysis of exemplary product made according to the invention (Run 4) is illustrated graphically in FIG. 1. As can be seen, the molecular weight distribution A is relatively narrow. This distribution is compared to product made using dicyclopentadiene as the olefin (Run 11) shown graphically in FIG. 2. As seen in FIG. 2, the molecular weight distribution B is much broader for the DCPD-containing product with multiple peaks, and there is a significant amount of low molecular weight material.

The hydroxyl number of the products is an indication of the amount of alkylation of the hydroxyl group on the aromatic ring by the terpene and olefin as compared to products wherein the terpene and olefin alkylate the aromatic ring itself. Hydroxyl numbers tend to decrease as the amount of terpene and/or olefin in the reaction mass are increased because more of the OH groups on the aromatic ring react to form ether linkages. Accordingly, as the amount of phenol was decreased relative to the amount of terpene and phenol in the reaction mass, the hydroxyl number likewise decreased as seen by comparing Runs 1–3, 8–10 and 13–15 using 94 grams of phenol with Runs 4–7 wherein the amount of phenol was only 60.2 grams. The hydroxyl number for the products of Runs 11–12 made using dicyclopentadiene was not determined because of the low amount of phenol used to conduct the reaction.

Having now described the invention and preferred embodiments thereof, it will be recognized by those of ordinary skill that the invention may be capable of numerous modifications, rearrangements and substitutions without departing from the spirit and scope of the invention as defined by the appended claims.

What is claimed is:

1. A method for making a low softening point terpene-phenol-based resin which comprises reacting a phenol dissolved in an organic solvent with a terpene and an acyclic mono-unsaturated olefin in the presence of a Lewis acid catalyst at a temperature below about 50° C. and for a time sufficient to produce an alkyl-modified terpene phenol resin having a softening point in the range of from about 70° to about 110° C. and a Gardner Color below about 6.

2. The method of claim 1 wherein the terpene is selected from the group consisting of α-pinene, β-pinene, d-limonene, dipentene (racemic limonene), δ-3 carene, β-phellandrene and pyrolysates α-pinene, β-pinene and δ-3 carene.

3. The method of claim 1 wherein the acyclic mono-unsaturated olefin is selected from the group consisting of diisobutylene, isobutylene, 2-methyl-2-butene, 2-methyl-2-pentene, 2-methyl-1-pentene, 1-octene, 1-decene and 1-dodecene.

4. The method of claim 1 wherein the organic solvent is selected from the group consisting of aliphatic solvents, aromatic solvents and mixtures of aliphatic and aromatic hydrocarbon solvents.

5. The method of claim 4 wherein the solvent comprises about 1 to about 99 wt. % naphtha and about 1 to about 99 wt. % xylene.

6. The method of claim 1 wherein the molar ratio of olefin to terpene ranges from about 1 to 99 to about 9 to 1.

7. The method of claim 1 wherein the molar ratio of phenol to terpene and olefin ranges from about 1 to 0.2 to about 1 to 5.

8. The method of claim 1 wherein the temperature ranges from about 25° to below about 50° C.

9. The method of claim 1 wherein the amount of catalyst used ranges from about 0.4 to about 5.0 wt. % of the phenol.

10. The method of claim 1 wherein the organic solvent comprises a solvent selected from the group consisting of benzene, toluene, xylene, chlorobenzene and methylene chloride.

11. The method of claim 1 wherein the Lewis acid catalyst comprises a catalyst selected from the group consisting of boron halides, aluminum halides and titanium halides.

12. The method of claim 1 wherein alkyl-modified terpene-phenol resin has a polydispersity index below about 1.5.

13. A modified terpene-phenol resin made by the process of claim 1 having a Gardner color ranging from about 1.9 to about 3.2.

14. A method for making an alkyl-modified terpene-phenol resin comprising reacting phenol dissolved in an organic solvent with a mixture containing from about 0.05 to about 4.0 moles of terpene per mole of phenol and from about 0.005 to about 3.6 moles of acyclic mono-unsaturated olefin per mole of phenol in the presence of a Lewis acid catalyst at a temperature ranging from about 5° to below about 75° C. for a time sufficient to produce an alkyl-modified terpene-phenol resin having a softening point in the range of from about 70° to about 110° C. and a Gardner color below about 6.

15. The method of claim 14 wherein the terpene is selected from the group consisting of α-pinene, β-pinene, d-limonene, dipentene (racemic limonene), δ-3 carene, β-phellandrene and pyrolysates α-pinene, β-pinene and δ-3 carene.

16. The method of claim 14 wherein the acyclic mono-unsaturated olefin is selected from the group consisting of diisobutylene, isobutylene, 2-methyl-2-butene, 2-methyl-2-pentene, 2-methyl-1-pentene, 1-octene, 1-decene and 1-dodecene.

17. The method of claim 14 wherein the organic solvent is selected from the group consisting of aliphatic solvents, aromatic solvents and mixtures of aliphatic and aromatic hydrocarbon solvents.

18. The method of claim 17 wherein the solvent comprises about 1 to about 99 wt. % naphtha and about 1 to about 99 wt. % xylene.

19. The method of claim 14 wherein the temperature ranges from about 25° to below about 50° C.

20. The method of claim 14 wherein the amount of catalyst used ranges from about 0.4 to about 5.0 wt. % of the phenol.

21. The method of claim 14 wherein the organic solvent comprises a solvent selected from the group consisting of benzene, toluene, xylene, chlorobenzene and methylene chloride.

22. The method of claim 14 wherein the Lewis acid catalyst comprises a catalyst selected from the group consisting of boron halides, aluminum halides and titanium halides.

23. The method of claim 14 wherein alkyl-modified terpene-phenol resin has a polydispersity index below about 1.5.

24. A modified terpene-phenol resin made by the process of claim 14 having a Gardner color ranging from about 1.9 to about 3.2.

25. A modified terpene-phenol resin comprising a reaction product of terpene, acyclic mon-saturated olefin and phenol wherein the reaction product has a number average molecular weight in the range from about 550 to about 680, daltons, a polydispersity index below about 1.5 and a Gardner color below about 6 prior to color improving treatment.

26. The modified terpene-phenol resin of claim 25 wherein the terpene is selected from the group consisting of α-pinene, β-pinene, d-limonene, dipentene (racemic limonene), δ-3 carene, β-phellandrene and pyrolysates α-pinene, β-pinene and δ-3 carene.

27. The modified terpene-phenol resin of claim 25 wherein the acyclic mono-unsaturated olefin is selected from the group consisting of diisobutylene, isobutylene, 2-methyl-2-butene, 2-methyl-2-pentene, 2-methyl-1-pentene, 1-octene, 1-decene and 1-dodecene.

28. The modified terpene-phenol resin of claim 25 wherein the resin has a Gardner color ranging from about 1.9 to about 3.2.

29. The modified terpene-phenol resin of claim 25 wherein the terpene comprises alpha-pinene and the olefin comprises diisobutylene.

30. A method for making an aliphatic-modified terpene-phenol resin which comprises reacting a phenol dissolved in an organic solvent with a mixture containing a terpene and an acrylic mono-unsaturated olefin at a mole ratio of the total amount of terpene and olefin in the mixture to the amount of phenol of from about 0.5 to about 3.0 total moles to moles of phenol in the presence of a Lewis acid catalysts and at a temperature below about 50° C. and for a time sufficient to produce an aliphatic-modified terpene-phenol resin having a softening point in the range of from about 70° C. to about 110° C. and a Gardner color below about 6.

31. The method of claim 30 wherein the terpene is selected from the group consisting of α-pinene, β-pinene, d-limonene, dipentene (racemic limonene), δ-3 carene, β-phellandrene and pyrolysates α-pinene, β-pinene and δ-3 carene.

32. The method of claim 30 wherein the acyclic mono-unsaturated olefin is selected from the group consisting of diisobutylene, isobutylene, 2-methyl-2-butene, 2-methyl-2-pentene, 2-methyl-1-pentene, 1-octene, 1-decene and 1-dodecene.

33. The method of claim 30 wherein the organic solvent is selected from the group consisting of aliphatic solvents, aromatic solvents and mixtures of aliphatic and aromatic hydrocarbon solvents.

34. The method of claim 30 wherein the solvent comprises about 1 to about 99 wt. % naphtha and about 1 to about 99 wt. % xylene.

35. The method of claim 30 wherein the temperature ranges from about 25° to below about 50° C.

36. The method of claim 30 wherein the amount of catalyst used ranges from about 0.4 to about 5.0 wt. % of the phenol.

37. The method of claim 30 wherein the organic solvent comprises a solvent selected from the group consisting of benzene, toluene, xylene, chlorobenzene and methylene chloride.

38. The method of claim 30 wherein the Lewis acid catalyst comprises a catalyst selected from the group consisting of boron halides, aluminum halides and titanium halides.

39. The method of claim 30 wherein the alkyl-modified terpene-phenol resin has a polydispersity index below about 1.5.

* * * * *

UNITED STATES PATENT AND TRADEMARK OFFICE
CERTIFICATE OF CORRECTION

PATENT NO. : 6,160,083
DATED : December 12, 2000
INVENTOR(S) : Kerry L. Thompson, Abhay K. Deshpande It is certified that error appears in the above-identified patent and that said Letters Patent is hereby corrected as shown below:

Column 7, in footnote 1, after "DIB" delete "id" and insert --is--.

Column 10, line 21, claim 14, after "below about" delete "75°" and insert --50°--

Signed and Sealed this

Twenty-ninth Day of May, 2001

Attest:

NICHOLAS P. GODICI

Attesting Officer     Acting Director of the United States Patent and Trademark Office